(12) United States Patent
Khosravi et al.

(10) Patent No.: US 9,342,666 B2
(45) Date of Patent: May 17, 2016

(54) PROVIDING SECURITY SUPPORT FOR DIGITAL RIGHTS MANAGEMENT IN DIFFERENT FORMATS

(71) Applicant: Intel Corporation, Santa Clara, CA (US)

(72) Inventors: Hormuzd M. Khosravi, Portland, OR (US); Edward C. Epp, Portland, OR (US); Sachin Agrawal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 13/664,843

(22) Filed: Oct. 31, 2012

(65) Prior Publication Data

US 2014/0122895 A1 May 1, 2014

(51) Int. Cl.
*G06F 21/10* (2013.01)

(52) U.S. Cl.
CPC ...................... *G06F 21/10* (2013.01)

(58) Field of Classification Search
CPC .............. G06F 21/10; H04N 21/4405; H04L 2463/101
USPC ..................... 713/164, 189; 726/26
See application file for complete search history.

(56) References Cited

U.S. PATENT DOCUMENTS

| | | | | |
|---|---|---|---|---|
| 7,565,685 B2* | 7/2009 | Ross | .................. | G06F 21/10 713/168 |
| 2002/0078361 A1* | 6/2002 | Giroux | ................ | H04L 63/0428 713/183 |
| 2003/0079222 A1* | 4/2003 | Boykin | ................ | H04N 7/1675 725/31 |
| 2004/0039907 A1* | 2/2004 | Sako | ................ | G11B 20/00086 713/164 |
| 2004/0151319 A1* | 8/2004 | Proudler | .................. | G06F 21/33 280/277 |
| 2005/0086509 A1* | 4/2005 | Ranganathan | .......... | G06F 21/57 726/27 |
| 2006/0198519 A9* | 9/2006 | Candelore | .............. | H04N 7/165 380/239 |
| 2007/0113266 A1* | 5/2007 | Ross | ...................... | G06F 21/10 726/1 |
| 2008/0219436 A1* | 9/2008 | Chen | ...................... | H04N 7/162 380/30 |
| 2014/0122895 A1* | 5/2014 | Khosravi | ................ | G06F 21/10 713/189 |

* cited by examiner

*Primary Examiner* — Dao Ho
(74) *Attorney, Agent, or Firm* — Trop Pruner & Hu, P.C.

(57) ABSTRACT

In accordance with some embodiments, technologies may be provided that is adaptable to any existing and potentially future digital rights management application. Thus, it is not necessary to provide duplicate systems to handle disparate digital rights formats in some embodiments.

19 Claims, 3 Drawing Sheets

PROVIDING SECURITY SUPPORT FOR DIGITAL RIGHTS MANAGEMENT IN DIFFERENT FORMATS

BACKGROUND

This relates generally to digital rights management.

In digital rights management, content providers provide content for viewing by individuals in a way that electronically guards the copyright of the content creator. For example, the ability to play the content may be limited so that the content only plays on a certain piece of hardware which is authorized to play the content. This prevents file sharing where the content creator does not get paid for the playing of copies of the file.

Because of the importance of digital rights management to the distribution of content, a large number of digital rights formats have been created. Different equipment and software providers have come up with different digital rights management applications or formats. Among the different applications are those offered by Microsoft, Cisco, Sony, Google, Comcast, Adobe, Nagravision, and MDS, to mention a few examples.

Typically, equipment providers provide hardware and firmware support for digital rights management. For example digital rights management capabilities typically appear in set top boxes associated with cable and satellite content distribution. Thus, each piece of equipment may be adapted to one particular digital rights management application. Alternatively, duplicative hardware and firmware may be used to accommodate two or more different digital rights management applications.

BRIEF DESCRIPTION OF THE DRAWINGS

Some embodiments are described with respect to the following figures.

DETAILED DESCRIPTION

Figure 1A:
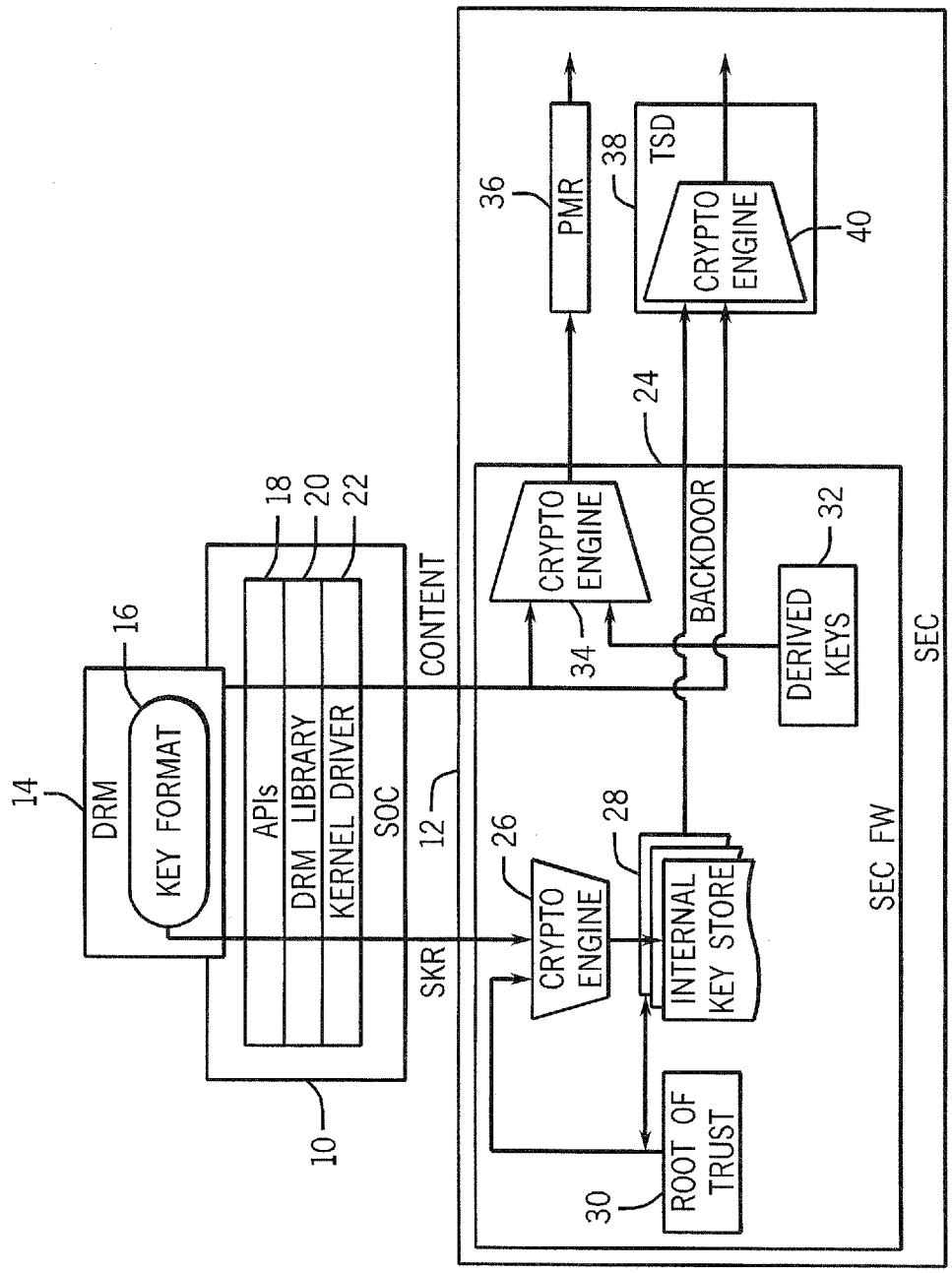
FIG. 1*a* is a schematic depiction for one embodiment.

In accordance with some embodiments, technologies may be provided that are adaptable to any existing, and potentially future, digital rights management application. Thus, it is not necessary to provide duplicate systems to handle disparate digital rights management formats in some embodiments.

Referring to FIG. 1, a platform 10 for providing content for playback by users may include a hardware component. In one embodiment, the platform 10 may be a system on a chip (SOC), such as an Intel® CE 4100 platform. The platform 10 and a security engine 12 (SEC) can be software, hardware, firmware or combinations thereof. That platform 10 may include processors and memories sufficient to implement the distribution of content and digital rights management technology. Typically the platform may be part of a set top box and may be coupled to a source of content, such as a satellite or cable system on one side, and may output content for playback on an authorized video decoder on the other side.

In some embodiments, the platform 10 may be coupled to the security engine 12, which in one embodiment is a dedicated processor-based integrated circuit that prevents access, by host-based applications, to securely stored information within the engine. However, authorized devices, such as video decoders, may be given access to decoded content for display. Thus in some embodiments, only authorized video decoders are capable of receiving an output playable stream, thereby effecting digital rights management.

As depicted in FIG. 1, any digital rights management application 14 (DRM) may be used with the platform 10 in some embodiments. In many cases more than one digital rights management application may be used because, in some embodiments, the platform 10 and the security engine 12 may accommodate any existing or future digital rights management schemes.

The platform 10 may include an adapter layer 15 including application programming interfaces (APIs) 18 that enable the platform 10 to work with a variety of different digital rights management formats. A library of data and code 20 may be used to implement specific operations for a plurality of digital rights management formats. A kernel driver 22 may be used to run the processor inside the platform 10 and to enable communications between the platform 10 and the security engine 12.

The security engine 12 may be in the same hardware component as platform 10 in one embodiment. The platform 10 and security engine 12 may be in any number of various devices (laptop, mobile devices, cell phone, etc.).

Figure 1B:
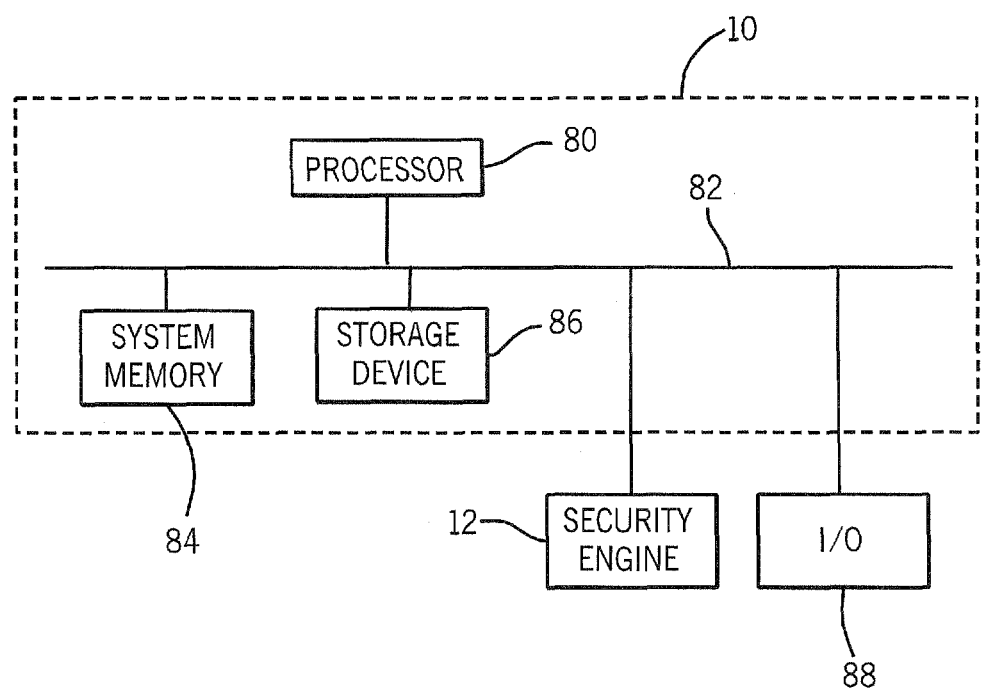
FIG. 1*b* is a system depiction for one embodiment.

In FIG. 1B, a system may include one or more processors 80 coupled via a bus 82 to a system memory 84. In one embodiment the memory 84 and processor 80 may be part of a system on a chip 10. A storage device 86 may store one or more of the APIs 18, library 20 and/or kernel drive 86. Coupled to the bus 82 and the system on a chip, in one embodiment, are the security engine 12 and one or more input/output devices 88. Other architectures are also contemplated.

Returning to FIG. 1, the security engine 12 may include security engine firmware 24 (SEC FW). A security engine provides a dedicated security function including cryptography. It may be a separate integrated circuit with onboard processors and secure storage, not accessible from outside the engine. The security engine firmware 24 may include two different crypto engines 26 and 34 in one embodiment. A root of trust 30 may be coupled to the crypto engine 26 and is also coupled to an internal key store 28. A root of trust is a component that always behaves in an expected manner because its misbehavior cannot be detected. A complete set of roots of trust has a set of functions to enable a description of the platform characteristics that affect the trust-worthiness of the platform. A derived key store 32 is coupled to the crypto engine 34. The store stores secret keys derived from a secret value.

The security engine 12 also includes a protected memory region 36 coupled to the exterior of the security engine firmware 24. A transport stream de-multiplexer 38 is also coupled to the exterior of the security engine firmware 24. Within the transport stream de-multiplexer 38 may be still another crypto engine 40.

A key format 16, such as a standard key format, extracted from the digital rights management application 14, is provided to the crypto engine 26. A standard key format is a key format specified by a standards organization. Examples include X509, and PKCS #12. Encrypted content provided by the digital rights management application 14 is provided to the crypto engine 34 and to the crypto engine 40. In one embodiment, the crypto engine 34 provides decryption for non-streaming blocks of secure content. Thus it may handle discrete files or images. Generally streaming content is passed to the crypto engine 40 within the transport stream de-multiplexer 38 which is can handle de-multiplexing of streams of data, such as Motion Picture Experts Group (MPEG) compressed information.

In some embodiments, the key format 16 is decrypted in the crypto engine 26 and then stored in an internal key store 28. This is done with the information provided by the root of trust 30. Thus, the root of trust 30 applied to the crypto engine 26 allows the crypto engine 26 to decrypt and securely store, in the internal key store 28, the decrypted key formats typically provided by digital rights management systems. This internal key store stores key information that then may be used to decrypt transport streams received by a digital rights management application 14 and forwarded for decryption to the crypto engine 40 within the transport stream de-multiplexer 38.

Likewise, the crypto engine 34 may use derived keys, developed from key ladders for example. In this way, the decrypted information may be securely stored in a protected memory region 36. The security engine 12 only provides the decrypted information to authorized hardware devices such as a video decoder associated with a set top box. All software components in the host system are unable to access the information in some embodiments.

Figure 2:
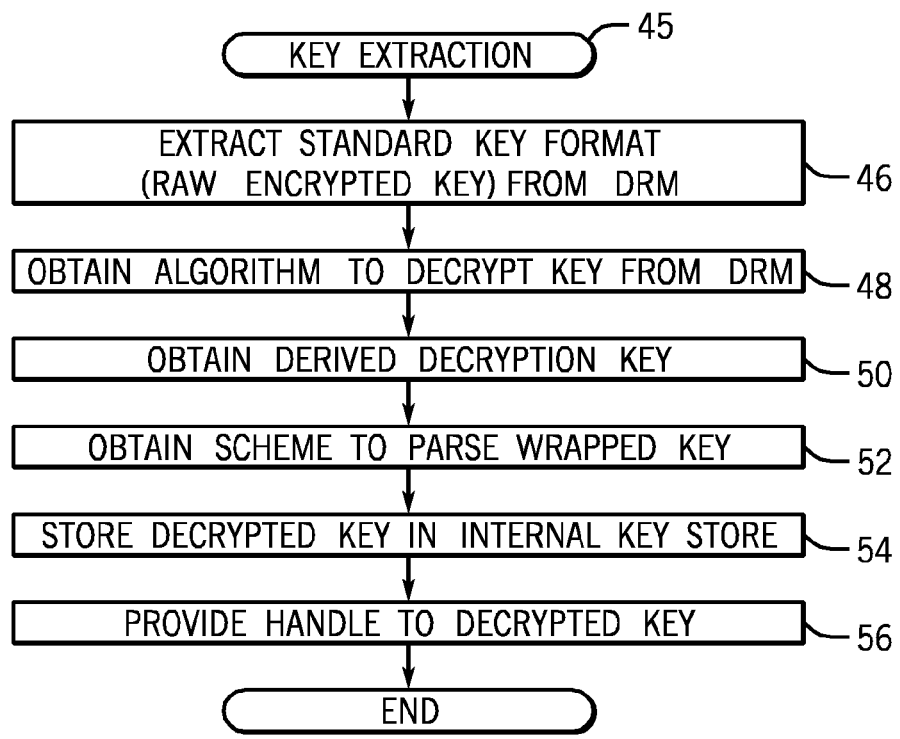
FIG. 2 is a flow chart for a key extraction sequence according to one embodiment.

A key extraction sequence 45, shown in FIG. 2, may be used to provide a handle to a decrypted key. It may be provided in software, firmware and/or hardware. In software and firmware embodiments it may be implemented by computer executed instructions stored in one or more computer storage readable media such as a magnetic, optical, or semiconductor storage. For example it may be stored within the security engine 12 or even in the platform 10.

Thus, referring to FIG. 2, the key extraction sequence 45 (indicated by the arrow between the key format 16 and the internal key store 24 in FIG. 1A) begins by extracting a standard key format, which is the raw encrypted key, from the digital rights management application 14 as indicated in block 46. Then an algorithm to decrypt the key is also obtained from the digital rights management system, as indicated in block 48. A derived decryption key may also be obtained and stored in the derived key store 32, as indicated in block 50.

A scheme to parse a wrapped key may be obtained in block 52. Some keys may be key wrapped. A key wrap is a cryptographic algorithm that uses Advanced Encryption Standard (AES) as a primitive to securely encrypt a plaintext key with any associated integrity information and data. For example, Adobe Access, a digital rights management system, encrypts a raw machine key with a session key. The encryption algorithm is AES, a session key is securely stored in the security engine and used to decrypt it, and PKCS #8 (a public-key cryptography standard published by RSA Security Inc.) is a scheme used to parse the RSA components out of the raw key buffer. A returned key identifier acts as a mechanism to wield the newly derived machine key.

Key properties that may need to be enforced in this scheme determine whether a key can be used to decrypt other keys in the digital rights management key ladder or to decrypt content. A scheme may be used to inherit these properties from a root key of trust. For example, one property may be that the key can only be used to decrypt intermediate key ladder keys. Another inherited property may be that leaf keys can only decrypt content.

The scheme may be extendible to newly developed digital rights management systems. New key formats can be added. For example, Widevine embeds 16 byte content keys within a 32 byte buffer. A new scheme can be written that parses the content key out of this buffer.

Next, the decrypted key is stored in the internal key store as indicated in block 54. Finally a handle to the decrypted key is made available to the transport stream de-multiplexer 38 as indicated in block 56.

Figure 3:
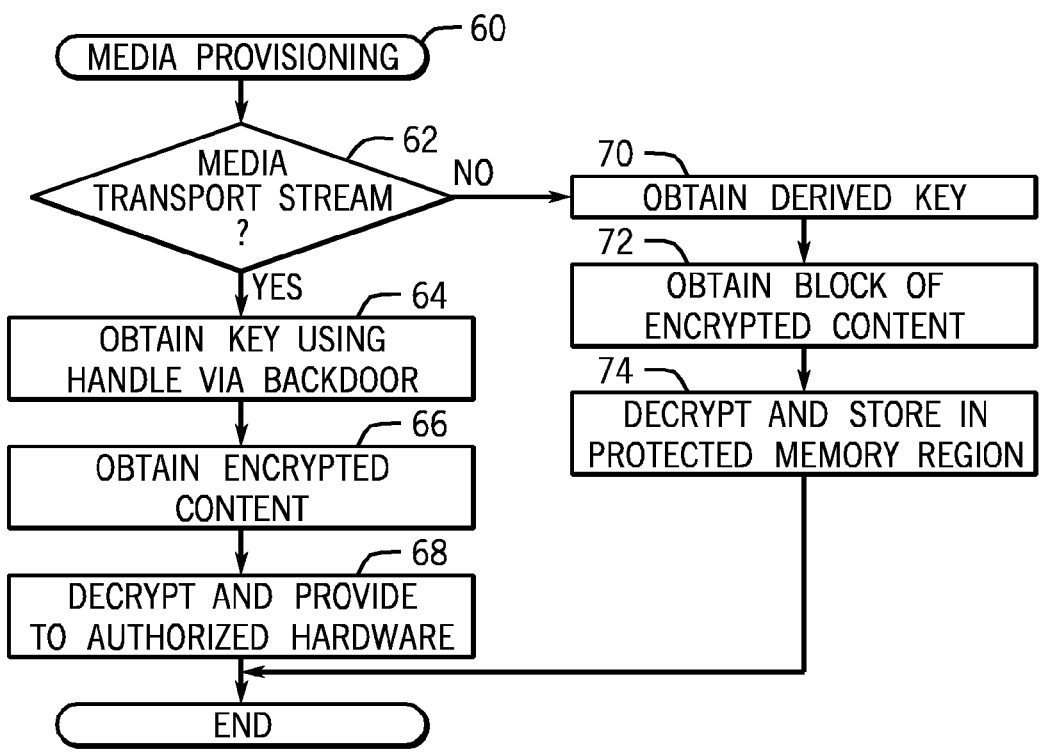
FIG. 3 is a flow chart for a media provisioning sequence in accordance with one embodiment.

When it comes time to use the encrypted content, the media provisioning sequence 60 shown in FIG. 3 may be used. It may be provided in software, firmware and/or hardware. In software and firmware embodiments it may be implemented by computer executed instructions stored in one or more computer readable storage media such as a magnetic, optical, or semiconductor storage. For example it may be stored within the security engine 12 or even in the platform 10.

The sequence 60 begins by determining, at diamond 62, whether the content stream from the digital rights management application 14 is a media transport stream. If so, the internal key is obtained using a handle as indicated in block 64 via the backdoor (shown in FIG. 1A). Then the encrypted content is obtained from the digital rights management application 14 as indicated in block 66. Finally the content is decrypted and provided to authorized hardware such as an authorized video decoder as indicated in block 68.

If the content is not a media transport stream, then a derived key is obtained as indicated in block 70 from the derived key store 32. A block of encrypted content is obtained, as indicated in block 72, in the crypto engine 34. This content is decrypted and stored in the protected memory region 36 (in FIG. 1A) as indicated in block 74 in FIG. 3.

In some embodiments, a generic digital rights management key may be provided in a factory. In this case, a provisioning tool may be used to provide the key within the secure driver firmware. The tool saves the wrapped key container in persistent storage. Then the secured driver and firmware encrypt and sign a blob with a chip unique key. The chip unique key is a key unique to the security engine 12. No other device can then decrypt platform using that key. A blob is encrypted data generated by a trusted platform module. See Trusted Platform Module Specification 1.2, Revision 1.16, published Mar. 3, 2011 and available from the Trusted Computing Group.

In another embodiment a generic digital rights management key may be derived in the field. For example, the system may verify a cipher-based message authentication code (CMAC) and decrypt it with the chip unique key to store the RSA digital rights management private key in the internal key store. A CMAC is a block cipher-based message authentication code algorithm that may be used to provide an indication of authenticity of data. Then the server_encrypted_DRM_key_tier2 is decrypted using RSAES-PKCS_v1_5 algorithm (i.e. a public-key cryptography standard published by RSA Security Inc. defined in RFC 2898, available from Network Working Group) and wrapped _drm_key_container.key_id. The decrypted blob is decoded using PKCS #8 (RFC 5208, available from Network Working Group, May 2008) format, generating an intermediate RSA key. Then the proper key rights are assigned to this key depending upon the tiers configured in the wrapped_drm_key_container, i.e. DECRYPT_KEYS|VERIFY_KEYS|SIGN_DATA. Then the tier level is assigned as 1. Finally the server_encrypted_drm_key_tier3 is decrypted using Advanced Encryption Standard-Cipher Block Chaining (AES-CBS) algorithm (RFC 3602) and server_encrypted_drm_key_tier3_id. Finally DATA_DECRYPT key rights to this key as it is being derived from the key which has tier level as 1.

In some embodiments, the system does not require custom security engine firmware modules for each proprietary digital rights management system that the platform needs to support. Instead, a general digital rights management framework firmware 24 and the corresponding software APIs can be used with a software adapter layer 15 that maps a digital rights management APIs to the generic digital rights management framework APIs 18. It may still provide the same robustness by using the security engine internal memory based keystore to store keys and secret data.

The following clauses and/or examples pertain to further embodiments:

One example embodiment may be one or more computer readable storage media storing instructions executed by a processor to perform a sequence comprising decrypting a standard key format extracted from a digital rights management application in a security engine and storing the decrypted format in an internal key store of the security engine. The media may further store instructions to perform a sequence including decrypting using a root of trust in said security engine. The media may further store instructions to perform a sequence including obtaining an algorithm to decrypt the key format from said application. The media may further store instructions to perform a sequence including providing a handle to said decrypted format. The media may further store instructions to perform a sequence including determining whether content is streaming content. The media may further store instructions to perform a sequence including decrypting non-streaming content using derived keys and storing decrypted content in a protected memory region of said security engine. The media may further store instructions to perform a sequence including if said content is streaming content, using said key and derived keys to decrypt said content in a transport stream demultiplexer. The media may further store instructions to perform a sequence including obtaining said key using a handle.

Another example embodiment may be a method comprising decrypting a standard key format extracted from a digital rights management application in a security engine on a computer platform and storing the decrypted format in an internal key store of the security engine. The method may also include decrypting using a root of trust in said security engine. The method may also include obtaining an algorithm to decrypt the key format from said application. The method may also include providing a handle to said decrypted format. The method may also include determining whether content is streaming content. The method may also include decrypting non-streaming content using derived keys and storing decrypted content in a protected memory region of said security engine.

Another example embodiment may be an apparatus comprising an internal key store inaccessible outside said apparatus, a first crypto engine to decrypt a key format extracted from a digital rights management application and store it in the internal key store, a second crypto engine to decrypt streaming content and a third crypto engine to decrypt non-streaming content. The apparatus may include a root of trust to decrypt the key format in conjunction with said first crypto engine. The apparatus may include a first crypto engine to use an algorithm obtained from said application to decrypt said key format. The apparatus may include a protected memory region to store decrypted content. An apparatus may include a third crypto engine to use derived keys and to store decrypted content in said region. The apparatus may include a second crypto engine to use the decrypted standard key format.

References throughout this specification to "one embodiment" or "an embodiment" mean that a particular feature, structure, or characteristic described in connection with the embodiment is included in at least one implementation encompassed within the present application. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present application.

What is claimed is:

1. One or more non-transitory computer readable storage media storing instructions executed by a processor to perform a sequence comprising:
   decrypting in a third crypto engine in a security engine a key format extracted from a digital rights management application coupled to the security engine, wherein decrypting uses information from a root of trust component and the digital rights management application;
   storing the decrypted key format in an internal key store of the security engine said security engine and said internal key store coupled to the root of trust component to enable description of platform characteristics that affect the trustworthiness of the platform that always behaves in an expected manner, wherein the internal key store is inaccessible from outside the security engine;
   determining whether content is streaming or non-streaming content;
   when non-streaming content is detected, using a derived key to decrypt non-streaming content using a first crypto engine within the security engine firmware;
   when streaming content is detected, using a handle to obtain the decrypted key via by accessing the key through a secret portal; and
   decrypting the streaming content with the decrypted key using a second crypto engine;
   wherein the second crypto engine is located outside the security engine firmware and inside the security engine.

2. The media of claim 1, further storing instructions to perform a sequence including decrypting using a root of trust in said security engine.

3. The media of claim 1, further storing instructions to perform a sequence including obtaining an algorithm to decrypt the key format from said application.

4. The media of claim 1, further storing instructions to perform a sequence including determining whether content is streaming content.

5. The media of claim 4, further storing instructions to perform a sequence including if said content is streaming content, using said key format and derived keys to decrypt said content in a transport stream demultiplexer.

6. The media of claim 1, further storing instructions to perform a sequence including obtaining said key format using a handle.

7. The media of claim 1, including interfaces, a kernel driver and code to handle at least two different digital rights management formats.

8. A method comprising:
   decrypting in a third crypto engine in a security engine a key format extracted from a digital rights management application coupled to the security engine on a computer platform, wherein decrypting uses the information from a root of trust component and the digital rights management application;
   storing the decrypted key format in an internal key store of the security engine said security engine and said key store coupled to a root of trust component to enable description of platform characteristics that affect the trustworthiness of the platform that always behaves in an expected manner, wherein the internal key store is inaccessible from outside the security engine;

determining whether content is streaming or non-streaming content;

when non-streaming content is detected, using a derived key to decrypt non-streaming content using a first crypto engine within the security engine firmware;

when streaming content is detected, using a handle to obtain a key via a by accessing the key through a secret portal; and decrypting the streaming content with the decrypted key using a second crypto engine;

wherein the second crypto engine is located outside the security engine firmware and inside the security engine.

9. The method of claim 8, including decrypting using a root of trust in said security engine.

10. The method of claim 8, including obtaining an algorithm to decrypt the key format from said application.

11. The method of claim 8, including determining whether content is streaming content.

12. The method of claim 11, including if said content is streaming content, using said key and derived keys to decrypt said content in a transport stream demultiplexer.

13. An apparatus comprising a security engine including:
an internal key store inaccessible outside the security engine of said apparatus;
a third crypto engine in the security engine to decrypt a key format extracted from a digital rights management application, wherein decrypting uses information from a root of trust component and the digital rights management application; and store the decrypted key format in the internal key store of said security engine, said internal key store coupled to the root of trust component to enable description of platform characteristics that affect the trustworthiness of the platform that always behaves in an expected manner, determine whether content is streaming or non-streaming content, when non-streaming content is detected, using a derived key to decrypt non-streaming content using a first crypto engine within the security engine firmware, when streaming content is detected, using a handle to obtain the decrypted key via by accessing the key through a secret portal, and use a second crypto engine to decrypt streaming content with the decrypted key; wherein the second crypto engine is located outside the security engine firmware and inside the security engine.

14. The apparatus of claim 13, including a root of trust to decrypt the key format in conjunction with said first crypto engine.

15. The apparatus of claim 13, said first crypto engine to use an algorithm obtained from said application to decrypt said key format.

16. The apparatus of claim 13, including a protected memory region to store decrypted content.

17. The apparatus of claim 16, said third crypto engine to use derived keys and to store decrypted content in said region.

18. The apparatus of claim 13, said second crypto engine to use the decrypted key format.

19. The apparatus of claim 13, including a plurality of interfaces, a kernel driver and code to handle at least two different digital rights management formats.

* * * * *

UNITED STATES PATENT AND TRADEMARK OFFICE
CERTIFICATE OF CORRECTION

PATENT NO.         : 9,342,666 B2
APPLICATION NO.    : 13/664843
DATED              : May 17, 2016
INVENTOR(S)        : Hormuzd M. Khosravi et al.

It is certified that error appears in the above-identified patent and that said Letters Patent is hereby corrected as shown below:

In the Claims

Column 6, line 63:
Delete "the"

Column 6, line 66:
After "internal," insert --"externally inaccessible"--

Signed and Sealed this
Ninth Day of August, 2016

Michelle K. Lee
*Director of the United States Patent and Trademark Office*